United States Patent [19]
Watanabe

[11] Patent Number: 5,239,433
[45] Date of Patent: Aug. 24, 1993

[54] MAGNETIC HEAD DEVICE
[75] Inventor: Shoyu Watanabe, Hyogo, Japan
[73] Assignee: Mitsubishi Denki Kabushiki Kaisha, Japan
[21] Appl. No.: 716,894
[22] Filed: Jun. 18, 1991
[30] Foreign Application Priority Data Jun. 20, 1990 [JP] Japan .................. 2-159839

[51] Int. Cl.$^5$ .................. G11B 5/02
[52] U.S. Cl. .................. 360/124
[58] Field of Search .......... 360/123, 124, 121

[56] References Cited
U.S. PATENT DOCUMENTS

| | | | |
|---|---|---|---|
| 4,331,992 | 5/1982 | Klein et al. | 360/124 |
| 4,786,991 | 11/1988 | Yamamori | 360/66 |
| 4,945,439 | 7/1990 | Sato | 360/124 |
| 4,965,681 | 10/1990 | Takimoto | 360/64 |

FOREIGN PATENT DOCUMENTS
4040491 6/1991 Fed. Rep. of Germany .

OTHER PUBLICATIONS
Japanese Patent Laid-Open No. 61-39910 (2/86) no translation furnished.

Primary Examiner—John H. Wolff
Attorney, Agent, or Firm—Wolf, Greenfield & Sacks

[57] ABSTRACT

A magnetic head apparatus arranged such that, for preventing a crosstalk between a plurality of magnetic heads, a crosstalk preventing element is coupled through a switching element in parallel to an erasing coil of each of the magnetic heads and a control section selectively energizes and deenergizes the switching element. This arrangement allows prevention of the crosstalk to the magnetic heads.

5 Claims, 4 Drawing Sheets

MAGNETIC HEAD DEVICE

BACKGROUND OF THE INVENTION

1. Field of the Invention

The present invention relates to a magnetic head apparatus to be used in flexible disk drive apparatus and others.

2. Description of the Prior Art

For instance, the Japanese Patent Laid-Open No. 61-39910 discloses a magnetic head to be employed for a flexible disk drive apparatus. FIG. 3 shows the magnetic head 1 illustrated in this publication, wherein numeral 2 represents a write/read core assembly including a L-shaped core 2a, an I-shaped core 2b and a back core 2c so as to constitute a closed magnetic circuit, the L-shaped core 2a and the I-shaped core 2b forming a write/read gap on a sliding surface, and numeral 3 designates a write/read coil wound around the L-shaped core 2a of the write/read core assembly 2, the write/read coil constituting a write/read head 4 together with the write/read core assembly 2. Further, numeral 5 denotes an erasing core assembly including a L-shaped core 5a, an I-shaped core (the I-shaped core 2b making up the aforementioned write/read core assembly 2), a back core 5c so as to constitute a closed magnetic circuit, the I-shaped core 5b forming an erasing gap on the sliding surface in conjunction with the L-shaped core 5a. Still further, numeral 6 is an erasing coil wound around the L-shaped core 5a of this erasing core assembly 5 which, in cooperation with the erasing core assembly 5, constitutes an erasing head 7.

As illustrated in FIG. 4, the magnetic head 1 thus constructed is operable such that the erasing head 7, preceding the write/read head 4, slides with respect to a track surface of a magnetic disk 8 along the rotational direction of the magnetic disk 8 so as to reproduce information on a recording track 9 or record information on the recording track 9. Furthermore, as shown in FIG. 5, for the magnetic disk 8 in which both surfaces are respectively used as track surfaces 8a and 8b, a magnetic head apparatus comprising a pair of magnetic heads 1a and 1b such as illustrated in FIG. 3 is used to perform the recording/reproducing operation.

On the other hand, in the case of reproducing information from the magnetic disk 8 by using the magnetic head shown in FIG. 3, in order for preventing occurrence of crosstalk at the write/read coil 3 on the basis of variation of the magnetic flux due to the recorded information on the magnetic disk 8 which appears at the erasing gap, the erasing coil 6 can be coupled in parallel to a crosstalk preventing element such as an inductance element as disclosed in the Japanese patent Application No. 2-41211.

Thus, in the case that an arrangement that provides a crosstalk preventing element to prevent a crosstalk to be generated by the erasing coil 6 at the time of the reproducing mode is applied to a magnetic head apparatus comprising a pair of magnetic heads as illustrated in FIG. 5, a device as illustrated in FIG. 6 is proposed in the Japanese Patent Application No. 2-41211. In FIG. 6, 3a and 3b respectively represent first and second write/read coils of first and second magnetic heads 1a and 1b, 6a and 6b respectively designate first and second erasing coils of the first and second magnetic heads 1a and 1b, 10 denotes a mode selection circuit which is responsive to a magnetic head selection signal A for selecting one of the first and second magnetic heads 1a, 1b and further to responsive to an operation mode signal B for selecting one of the recording and reproducing modes so as to output a switching signal, and 11a depicts a first switching control means which is responsive to the switching signal from the mode selection circuit 10 so as to control the above-mentioned first write/read coil and first erasing coil 6a. The first switching control means 11a is activated when the magnetic head selection signal A is indicative of the selection of the first magnetic head 1a and arranged to cause a recording current corresponding to the information to flow through the first write/read coil 3a and cause a constant current to pass through the first erasing coil 6a when the operation mode signal B is representative of the recording mode and further arranged to output the read voltage obtained through the first write/read coil 3a at the time of the reproducing mode. Further, 11b represents a second switching control means which is responsive to the switching signal from the mode selection circuit 10 so as to control the above-mentioned second write/read coil 3b and second erasing coil 6b. The second switching control means 11b is activated when the above-mentioned magnetic head selection signal A is indicative of the selection of the second magnetic head 1b, and arranged to cause a recording current corresponding to the information to flow through the second write/read coil 3b and cause a constant current to pass through the second erasing coil when the operation mode signal B is representative of the recording mode and to output the read voltage obtained through the second write/read coil 3b at the time of the reproducing mode. Still further, 12a and 12b respectively represent read amplifiers which are responsive to the read voltages from the above-mentioned first and second switching control means 11a and 11b so as to amplify the read voltages therefrom, 13a and 13b are first and second crosstalk preventing elements each of which comprises an inductance element and which are respectively provided with respect to the first and second erasing coils 6a and 6b of the first and second magnetic heads 1a and 1b, 14a and 14b are switching elements each of which is composed of a transistor element and which are respectively coupled in series to the first and second crosstalk preventing elements and coupled in parallel to the first and second erasing coils 6a and 6b corresponding thereto. The first and second switching elements 14a and 14b are responsive to the above-mentioned operation mode signal B so as to be deenergized when the operation mode signal B is indicative of the recording mode and energized when being representative of the reproducing mode.

Secondly, a description will be made hereinbelow in terms of the operation to the magnetic head apparatus thus arranged. First, let it be assumed that the magnetic head selection signal A is representative of the selection of the first magnetic head 1a and the operation mode signal B is indicative of the recording mode. Thus, the first switching control means 11a is activated and the recording mode is set. At this time, the second switching control means 11b is in the non-activated state and the first and second switching elements 14a and 14b are respectively in the deenergized states. In response to the first switching control means 11b being activated and the recording mode being set, the first switching control means 11a causes the recording current corresponding to the information to flow through the first write/read coil 3a and further causes the constant current to pass through the first erasing coil 6a. As a result, the information previously recorded is erased from the first track surface 8a of the magnetic disk 8 by means of the first erasing coil 6a and information is recorded on the erased track by the first write/read coil 3a.

On the other hand, in response to the operation mode signal B being indicative of the reproducing mode, the first switching control means 11a is set to the reproducing mode so as to detect the reproduced voltage corresponding to the information recorded on the first track surface 8a of the magnetic disk 8 which reproduced voltage is developed at the first write/read coil 3a, the detected reproduced voltage being outputted to the first read amplifier 12a. At this time, the first and second switching elements 14a and 14b respectively enter into the energized states by the operation mode signal B indicative of the reproducing mode. Accordingly, a current flows through the first erasing coil 6a on the basis of the information recorded on the first track surface 8a of the magnetic disk 8 and a back electromotive force is developed in the first crosstalk preventing element 13a, coupled in parallel to the first erasing coil 6a, in accordance with the current, so that the back electromotive force causes a cancelling magnetic flux to generate in the first core assembly 5 so as to cancel the magnetic flux which is developed on the basis of the information recorded on the first track surface 8a of the magnetic disk 8, thereby suppressing the generation of the crosstalk in the first write/read coil 3a.

Furthermore, let it be assumed that the magnetic head selection signal A is representative of the selection of the second magnetic head 1b, the second switching control means 11b is activated and the first switching control means 11a enters into the non-activated state. Moreover, the second switching control means 11b is set to the recording or reproducing mode in accordance with the operation mode signal B so as to control control the second write/read coil 3a and the second erasing coil 6b to effect the recording and reproduction as well as the case that the above-mentioned first switching control means 11a is activated. Accordingly, in the case of being arranged as illustrated in FIG. 6, although in the reproduction due to the first magnetic head 1a it is possible to suppress the crosstalk generated in the first write/read coil 3a by the magnetic flux developed at the first erasing core assembly 5, a current flows through the second erasing coil 6b of the second magnetic head 1b due to the information recorded on the second track surface 8a of the magnetic disk 8 and hence a back electromotive force occurs by the second crosstalk preventing element 13b so that a cancelling magnetic flux is generated in the second erasing coil 6b. There is a problem that the cancelling magnetic flux is leaked as the crosstalk to the first write/read coil 3a. Similarly, in the case of the reproduction of the second magnetic head 1b, there is a problem that the cancelling magnetic flux generated in the first erasing coil 6a due to the first crosstalk preventing element 13a is leaked as the crosstalk to the second write/read coil 3b which is in the reproducing state.

SUMMARY OF THE INVENTION

The present invention has been developed in order to eliminate the above-described problems, and contemplates to provide a magnetic head apparatus comprising a plurality of magnetic heads which is capable of giving a high reliability by sufficiently suppressing a crosstalk.

A magnetic head apparatus according to this invention is equipped with a plurality of magnetic heads, a plurality of crosstalk preventing elements respectively provided with respect to the erasing coils of the respective magnetic heads, a plurality of switching elements respectively coupled in series to the crosstalk preventing elements and respectively coupled in parallel to the corresponding erasing coils, and control means responsive to an magnetic head selection signal for selecting one of the plurality of magnetic heads and further to an operation mode signal for selecting one of the recording mode and the reproducing mode so as to selectively energize and deenergize the switching element with respect to the magnetic head in accordance with the operation mode.

In this invention, for instance, when the operation mode signal is indicative of the reproducing mode, the control means energizes the switching element provided in correspondence with the magnetic head selected by the magnetic head selection signal and on the other hand, deenergizes the switching element provided in correspondence with the different magnetic head so that the crosstalk preventing element with respect to the selected magnetic head operates and the crosstalk preventing element with respect to the non-selected magnetic head does not operate.

The above and other objects, features, and advantages of the Invention will become more apparent from the following description when taken in conjunction with the accompanying drawings.

DESCRIPTION OF THE PREFERRED EMBODIMENT

Figure 1:
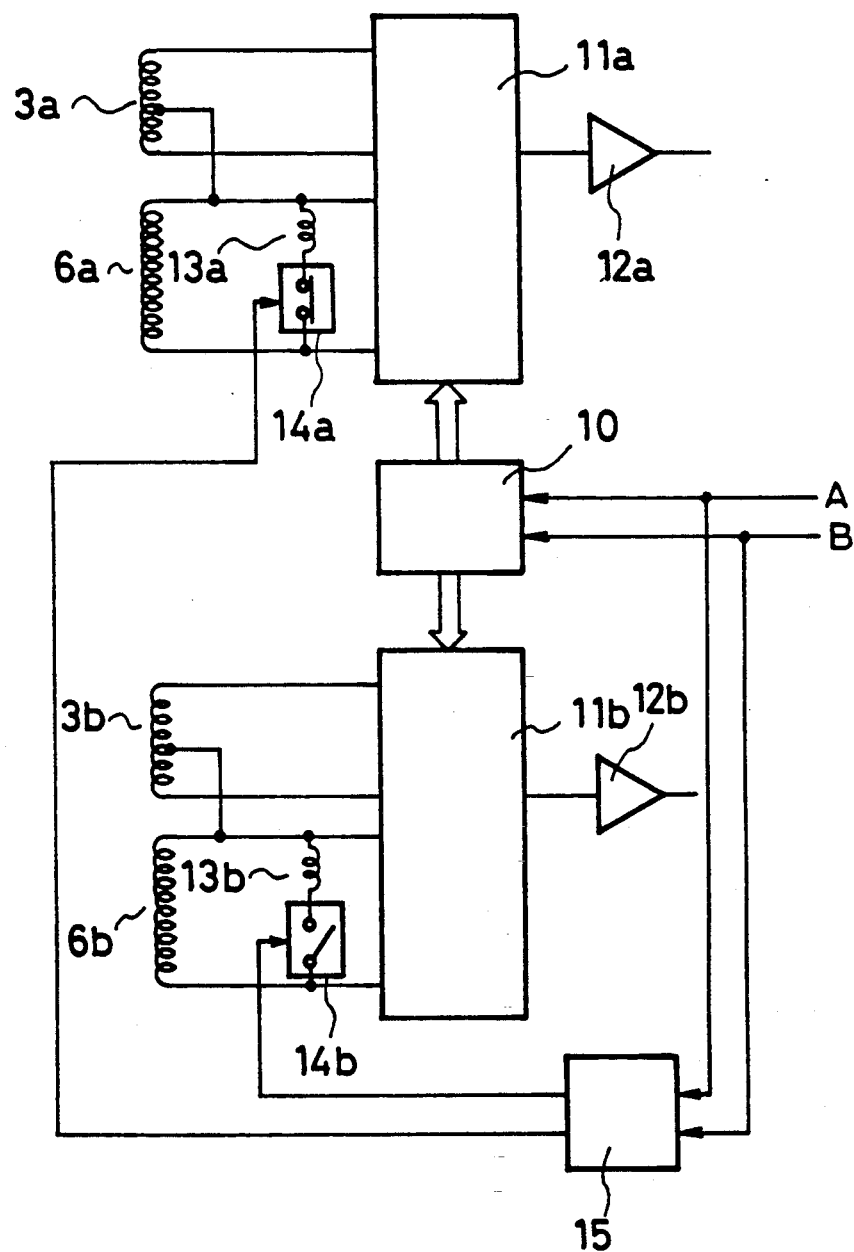
FIG. 1 is a block diagram showing an embodiment of the present invention.

An embodiment of this invention will be described hereinbelow with reference to FIG. 1. In the illustration, numeral 15 represents a control means responsive to a magnetic head selection signal A and an operation mode signal B, the control means deenergizing a switching element 14a or 14b provided in correspondence with a magnetic head 1a or 1b selected by the magnetic head selection signal A when the operation mode signal B is indicative of a recording mode, and energizing the switching element 14a or 14b provided in correspondence with the magnetic head 1a or 1b selected by the magnetic head selection signal A and deenergizing the switching element 14a or 14b provided in correspondence with the other magnetic head 1a or 1b when the operation mode signal B is representative of a reproducing mode.

Secondly, a description will be made hereinbelow in terms of the operation of the magnetic head apparatus thus arranged. First, let it be assumed that the magnetic head selection signal A represents the first magnetic head 1a and the operation mode signal B indicates the recording mode. A first switching control means is activated and the recording mode is selectively taken. At this time, a second switching control means 11b is inactivated and the first and second switching elements 14a and 14b are respectively deenergized by means of the control means 15, so that first and second crosstalk preventing means are arranged so as not to be coupled to first and second erasing coils 6a and 6b. In response to the first switching control means 11a being activated to take the recording mode, the first switching control means 11a supplies a recording current corresponding to the information to a first write/read coil 3a and further supplies a constant current to the first erasing coil 6a. As a result, on the first track surface 8a of the magnetic disk 8, the previously recorded information is erased by the first erasing coil 6a and information is newly recorded in the information-erased track by means of the first write/read coil 3a.

On the other hand, when the operation mode signal B shows the reproducing mode, the first switching control means 11a takes the reproducing mode so as to detect the reproduction voltage due to the first write/read coil 3a, which corresponds to the information recorded on the first track surface 8a of the magnetic disk 8, to output the detection result to a first read amplifier 12a for reproduction. At this time, under the control of the control means 15, the first switching element 14a enters into the energized state and the second switching element 14b is kept to the deenergized state. Accordingly, a current based upon the information recorded on the first track surface 8a of the magnetic disk 8 flows through the first erasing coil 6a and, in accordance with this current, a back electromotive force occurs at the first crosstalk preventing element 13a coupled in parallel to the first erasing coil 6a. This back electromotive force causes the cancelling magnetic flux to generate at the first erasing core assembly 5 through the first erasing coil 6a, and therefore the magnetic flux developed by the first erasing core assembly 5 due to the information recorded on the first track surface 8a of the magnetic disk 8 is cancelled so as to suppress the generation of the crosstalk at the first write/read coil 3a. In addition, since the second crosstalk preventing element 13b is arranged so as not to be coupled to the second erasing coil 6b, even if a current based on the information recorded on the second track surface 8b of the magnetic disk 8 flows through the first erasing coil 6a, the current does not flow through the second crosstalk preventing element 13b so that the cancelling magnetic flux does not occur through the second erasing coil 6b and the crosstalk does not occur at the first write/read coil 3a which is in the reproducing state.

Further, assuming that the magnetic head selection signal A is indicative of the selection of the second magnetic head 1b, the second switching control means 11b is activated and the first switching control means 11a enters into the non-activated state. Moreover, the second switching control means 11b is set to the recording or reproducing mode in accordance with the operation mode signal B so as to control the second write/read coil 3b and the erasing coil 6b as well as the case that the above-mentioned first switching control means 11a being activated, thereby effecting the recording and reproduction. At the same time, the control means 15 controls the first and second switching elements 14a and 14b so as to prevent the generation of the crosstalk.

Figure 2:
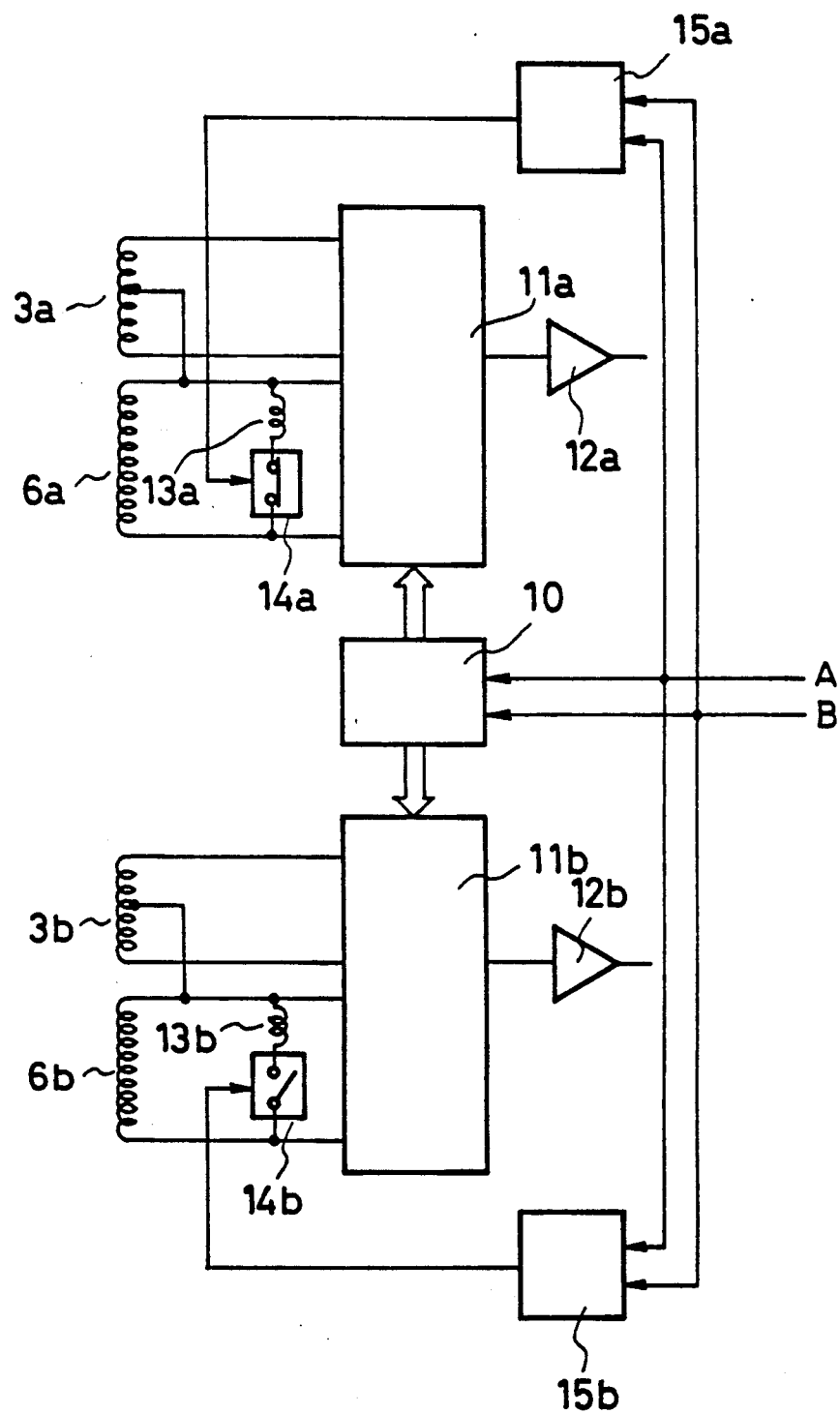
FIG. 2 is a block diagram illustrating another embodiment of this invention.
Figure 3:
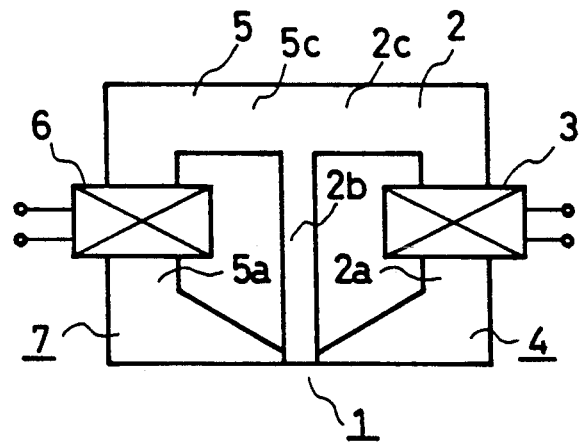
FIG. 3 is a side view showing a conventional magnetic head.
Figure 4:
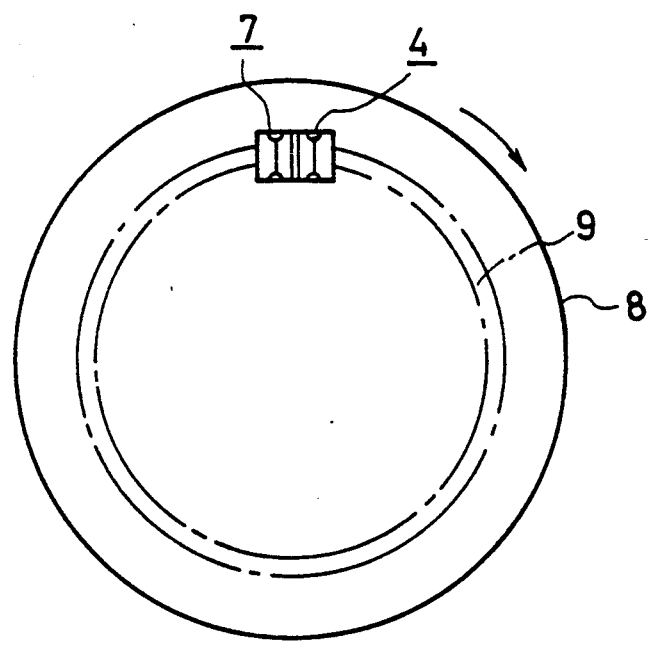
FIGS. 4 and 5 are illustrations for describing the relation between a pair of magnetic heads and a magnetic disk.
Figure 5:
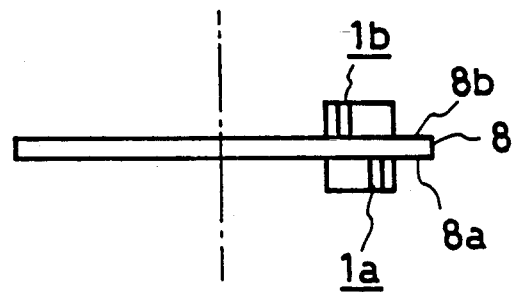
Figure 6:
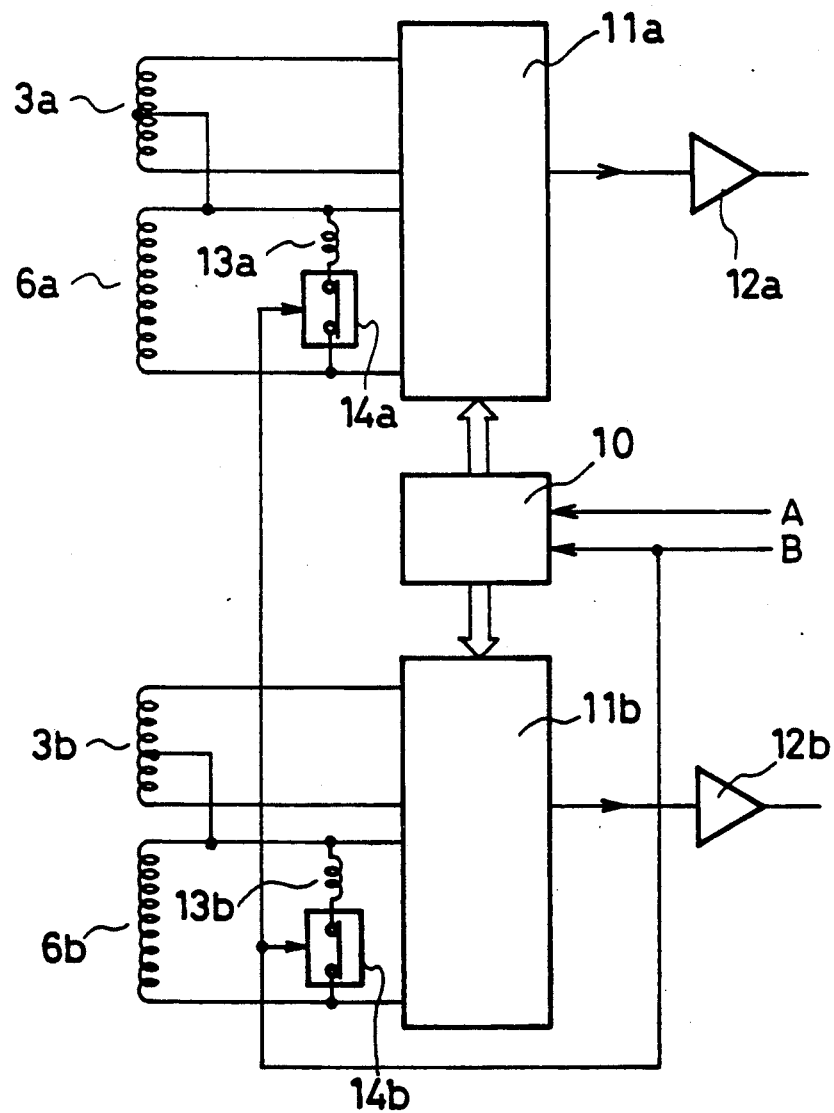
FIG. 6 is a block diagram showing a magnetic head apparatus previously proposed.

FIG. 2 illustrates the other embodiment of the present invention where, in place of the control means 15 in the above-described embodiment, first and second control means 15a and 15b are respectively provided with respect to the first and second switching elements 14a and 14b. This embodiment can also offer the same effect as the above-described embodiment.

Here, although in the above-described embodiment each of the first and second crosstalk preventing elements 13a and 13b is composed of an inductance element, it is appropriate to use a resistor with a low resistance below 100Ω (also allowing only the wiring resistance), and it is also appropriate to use a diode element or a capacitor element. Further, although in the above-described embodiment a pair of magnetic heads 1a and 1b are used for recording and reproducing information on and from both the track surfaces of the magnetic disk 8, this invention is also applicable to the case that a pair of magnetic heads 1a and 1b are used for effecting the recording and reproduction on and from one track surface of the magnetic disk 8. In addition, it is possible to apply to an apparatus with three or more magnetic heads. Moreover, this invention is applicable to composite magnetic heads comprising a magnetic head having a write/read and an erasing coil and a magnetic head having a write/read coil. Still further, although in the above-described embodiment the first and second magnetic heads are of the erase-preceding type that the erasing head 7 is ahead of the write/read head 4, it is appropriate to use magnetic heads of the tunnel-erase type that the write/read head 4 is ahead of the erasing head 7. This arrangement can offer the same effect.

As described above, the magnetic head apparatus according to this invention is equipped with a plurality of magnetic heads, and further equipped with a plurality of crosstalk preventing elements each provided with respect to each of the erasing coils of the respective magnetic heads, a plurality of switching elements respectively coupled in series to the crosstalk preventing elements and coupled in parallel to the corresponding erasing coils, and control means responsive to the magnetic head selection signal and the operation mode signal so as to deenergize the switching element provided in correspondence with the magnetic head selected by the magnetic head selection signal when the operation mode signal is indicative of the recording mode and selectively energize and deenergize the switching element provided in correspondence with the magnetic head selected by the magnetic head selection signal when the operation mode signal is representative of the reproducing mode. Thus, when one magnetic head reproduces the information, the crosstalk preventing means provided in correspondence with the magnetic head suppresses the affection of the crosstalk, and a cancelling magnetic flux does not occur due to the crosstalk preventing means provided in correspondence with the other magnetic head which is not in the reproducing state, thereby allowing the prevention of the crosstalk to the magnetic head which is in the reproducing state.

What is claimed is:

1. A magnetic head apparatus comprising: a plurality of magnetic heads each having at least a write/read coil wound around a write/read head and an erasing coil wound around an erasing head; a plurality of crosstalk preventing elements each provided through a switching element in parallel to each of said erasing coil of each of said magnetic head; and control means responsive to a magnetic head selection signal for selecting one from said plurality of magnetic heads and an operation mode signal for selecting one of a recording mode and a reproducing mode so as to selectively energize and deenergize said switching element with respect to said magnetic head in accordance with said operation mode signal.

2. A magnetic head apparatus as claimed in claim 1, wherein said plurality of magnetic heads are provided to be in confronting relation to both track surfaces of a single magnetic disk.

3. A magnetic head apparatus as claimed in claim 1, wherein said plurality of magnetic heads are closely provided with respect to one track surface of a single magnetic disk.

4. A magnetic head apparatus as claimed in claim 1, wherein said crosstalk preventing element is constructed by one selected from an inductance element, a resistor, a diode element and a capacitor element.

5. A magnetic head apparatus as claimed in claim 1, wherein said magnetic head is arranged such that said erasing head is positioned to be ahead of said write/read head in a rotating direction of a magnetic disk.

* * * * *